US006987163B2

(12) United States Patent
Cabasso et al.

(10) Patent No.: US 6,987,163 B2
(45) Date of Patent: Jan. 17, 2006

(54) MODIFIED POLYBENZIMIDAZOLE (PBI) MEMBRANES FOR ENHANCED POLYMER ELECTROCHEMICAL CELLS

(75) Inventors: Israel Cabasso, Syracuse, NY (US); Youxin Yuan, Syracuse, NY (US); Frederick E. Johnson, Syracuse, NY (US)

(73) Assignee: Research Foundation of the State University of New York, Albany, NY (US)

( * ) Notice: Subject to any disclaimer, the term of this patent is extended or adjusted under 35 U.S.C. 154(b) by 295 days.

(21) Appl. No.: 10/213,694

(22) Filed: Aug. 7, 2002

(65) Prior Publication Data

US 2004/0028976 A1   Feb. 12, 2004

(51) Int. Cl.
*C08G 73/18* (2006.01)

(52) U.S. Cl. .................. 528/327; 528/170; 528/172; 528/173; 528/174; 528/310; 528/313; 528/331; 528/337; 528/341; 528/342; 528/348; 528/350; 528/352

(58) Field of Classification Search .......... 528/327, 528/331, 342, 337, 313, 348, 207, 310, 170, 528/172, 173, 174, 341, 350, 352, 353; 525/419, 525/420, 435
See application file for complete search history.

(56) References Cited

U.S. PATENT DOCUMENTS

| 4,033,308 | A | | 7/1977 | Hayashi et al. |
| 4,154,919 | A | * | 5/1979 | Sheratte ...................... 528/186 |
| 4,535,144 | A | * | 8/1985 | Choe et al. ................. 528/207 |
| 4,814,399 | A | | 3/1989 | Sansone et al. |
| 4,898,917 | A | * | 2/1990 | Sansone ...................... 525/420 |
| 4,933,397 | A | * | 6/1990 | Sansone et al. ............. 525/435 |
| 4,997,892 | A | * | 3/1991 | Sansone et al. ............. 525/435 |
| 5,422,411 | A | | 6/1995 | Wei et al. |
| 5,525,436 | A | | 6/1996 | Savinell et al. |
| 5,599,639 | A | | 2/1997 | Sansone et al. |
| 5,716,727 | A | | 2/1998 | Savinell et al. |
| 6,632,847 | B1 | * | 10/2003 | Soczka-Guth et al. ........ 521/27 |
| 6,790,931 | B2 | * | 9/2004 | Cui et al. .................... 528/373 |

OTHER PUBLICATIONS

Samuel C. Temin, Journal of Fire and Flammability, Jan. 3, 1972, pp. 19-28.
Gieselman et al., Macromolecules, vol. 25, 1992, pp. 4832-4834.

* cited by examiner

*Primary Examiner*—P. Hampton Hightower
(74) *Attorney, Agent, or Firm*—Morgan & Finnegan, LLP (57) ABSTRACT

The invention relates to a modified polybenzimidazole (PBI), membranes that are fabricated from these polymers, and their use in electrochemical applications. These membranes have high ionic conductivity and are suitable for solid polymer electrolytes in electrochemical applications, especially for high temperature polymer electrolyte membrane (PEM) fuel cells.

11 Claims, 7 Drawing Sheets

MODIFIED POLYBENZIMIDAZOLE (PBI) MEMBRANES FOR ENHANCED POLYMER ELECTROCHEMICAL CELLS

FIELD OF THE INVENTION

This invention relates to modified polybenzimidazoles and a novel membrane with high thermal stability that is based on modified polybenzimidazoles. The membranes can be used in a variety of electrochemical applications, such as polyelectrolyte membrane fuel cells.

BACKGROUND OF THE INVENTION

Polybenzimidazole (PBI) is a polymeric material comprising very high levels of heat resistance, strength, and chemical stability and may be used in many applications, such as, heat-resistant fibers, coating varnishes, etc. However, polybenzimidazoles that currently are commercially available are expensive and have lack proton exchanging ability necessary for polyelectrolyte membrane (PEM) fuel cells. This significantly limits their use as components in electrochemical applications.

Sansone, et al., in U.S. Pat. Nos. 4,814,399 and 5,599,639, describe synthetic modification of PBI by removing imino hydrogens with an alkali metal hydride and reacting the resulting anion with a sulfone or a haloalkyl phosphonate to yield a PBI-N-alkane sulfonate or PBI-N-alkane phosphonate, respectively. The anion also may be reacted with an alkyl halide (U.S. Pat. No. 4,898,917) or an aryl fluoride (U.S. Pat. No. 4,933,397) to yield an N-alkyl PBI or an N-aryl PBI, respectively.

Savinell, et al., in U.S. Pat. No. 5,525,436, describe a technique of imbibing polyprotic inorganic acids, such as $H_2SO_4$ or $H_3PO_4$, into PBI films to yield acid proton conducting membranes. In U.S. Pat. No. 5,716,727, Savinell, et al. describe direct casting of an $H_3PO_4$ saturated PBI membrane from trifluoroacetic acid solution. Wei, et al., in U.S. Pat. No. 5,422,411, describe synthesizing sulfonic acid and phosphonic acid substituted $\alpha,\beta,\beta$-trifluorostyrene polymers.

Fuel cells are electrochemical cells that generate electrical current by oxidation and reduction reactions that occur at electrodes known as a cathode and an anode, respectively. Between the two electrodes is an electrolyte for conducting ions generated at the electrodes. Fuel cells that use an ion exchange polymer as the electrolyte are referred to as polyelectrolyte membrane (PEM) fuel cells. Oxygen is a typical oxidant fuel while typical reductant fuels are hydrogen and methanol.

In the case of hydrogen/oxygen fuel cells where oxygen gas is the oxidant and hydrogen gas is the reductant, protons are transported through the membrane from the anode to the cathode. The electrolyte used must possess high proton conductivity as well as chemical inertness toward the reactants. High oxidative and reductive stability are thus an important requirement for hydrogen/oxygen fuel cell electrolytes. Since these cells produce water as a byproduct and may be operated at elevated temperatures, high thermal, as well as, hydrolytic stability in aqueous acidic media also are required. Generally, a good membrane for the PEM fuel cells has to meet the following criteria:

1) chemical and electrochemical stability in the fuel cell operating environment;

2) mechanical strength and stability under cell operating conditions;

3) high proton conductivity, low permeability to reactant gas, and high water transport; and 4) low production cost.

Cation exchange polymers based on poly 2,2'-(m-phenylene)-5,5' bibenzimidazole (PBI) having the following structure:

have been used in PEM fuel cell electrolytes and have inherent thermal and chemical stability resulting from the all aromatic character. This polybenzimidazole also possesses good mechanical strength and is commercially available from Celanese Corporation (Charlotte, N.C.). They are also reasonably tractable and can be dissolved in N,N-dimethyl acetamide, dimethyl sulfoxide, and N-methyl-2-pyrrolidone.

Other polyelectrolytes for PEM fuel cell use include Nafion® (Dupont; Wilmington, Del.) commercially available from a perfluorinated aliphatic polysulfonic acid and sulfonated polystyrene, described in U.S. Pat. Nos. 3,282,875 and 4,330,654. Nafion® possesses good proton conductivity and excellent chemical stability, but suffers from high cost and intractability. Additionally, sulfonated polystyrene lacks chemical and thermal stability and tends to limit its use in PEM fuel cell applications.

Therefore, there is a need for an inexpensive and efficient material, such as one that has high thermal and chemical stability, high ionic conductivity, miscibility with other polymers, and good mechanical strength and tractability, suitable for solid polymer electrolytes in electrochemical applications, and especially for high temperature polymer electrolyte membrane (PEM) fuel cells and in electrochemical applications.

SUMMARY OF THE INVENTION

The present invention relates to synthetically modified polybenzimidazole (PBI) polymers, membranes comprising the modified PBI polymers, methods of preparing the polymers and corresponding membranes, and methods of using the polymer and membranes in electrochemical applications.

In one aspect of the invention, PBI may be modified by phosphonylation with dialkyl phosphonyl groups attached to the backbone producing a soluble polymeric phosphonate ester. The formed ester may be hydrolyzed in strong acid media or with a trimethylsilyl halide to form the corresponding polyphosphonic acid and produce a soluble polyelectrolyte. Modified PBI polymers of the invention have modifications, such as phosphonylation and sulfonation.

A further aspect of the invention relates to the phosphonylation, bromination phosphonylation, bromination sulfonation, or both phosphonylation and sulfonation of PBI or sulfoalkylated PBI. In fact, dialkyl phosphonyl groups have been shown to impart a combination of desirable properties to polymer chains, such as increased solubility in a wider variety of solvents, miscibility with other polymers, and the ability to chelate metal salts. Further, low molecular weight P=O containing compounds, such as trialkyl phosphates, dialkyl alkane phosphonates, and trialkyl phosphine oxides, are able to chelate metal salts containing lithium ions, various transition metal ions, and particularly uranyl salts ($UO_2X_2$). Polymeric phosphonate esters are also known to display similar chelating abilities and find similar applications as described herein.

Yet another aspect of the invention relates to methods of preparing the modified polybenzimidazoles polymers and corresponding membranes, where the membrane is fabricated from these polymers by solution blending and solution casting. The membranes of the invention comprise phosphonylated PBI, brominated sulfonated PBI, and blended membranes. The blended membranes comprise any phosphonylated PBI combination, where the second component may be selected from PBI-N-propane sulfonate having two N-propane sulfonate groups per repeat unit (PBI-$NPS_2$), brominated-PBI-$NPS_2$, and polysulfonic acids: sulfonated poly(phenylene oxide) (SPPO), sulfonated hexafluoro-bisphenol A polysulfone ($F_6$-SPS), and sulfonated poly ether sulfone (SPES).

In a further aspect of the invention, modified PBI containing polyphosphonic acid groups can be fabricated into membranes for use in electrochemical applications, such as PEM fuel cells, batteries, and sensors. More particularly, the invention relates to a membrane having high ionic conductivity that is suitable for solid polymer electrolytes in electrochemical applications, and especially for high temperature polymer electrolyte membrane (PEM) fuel cells. Therefore, a modified PBI may be beneficial for use in various electrochemical applications, such as fuel cells, batteries, sensors, etc.

DETAILED DESCRIPTION OF THE INVENTION

The present invention relates to a modified polybenzimidazole (PBI) polymer, a membrane comprising the modified PBI, methods of preparing and using the modified polymer and membrane.

In one aspect of the invention, a PBI polymer is modified, preferably by phosphonylation with dialkyl phosphonyl groups attached to the backbone producing a soluble polymeric phosphonate ester. The modified PBI polymer solution may be prepared, for example, by dissolving sufficient polybenzimidazole in the solvent to yield a final solution containing from about 1 to about 30 percent by weight of the polymer based on the total weight of the solution to form a solution of modified PBI. It is preferred that the concentration of modified polybenzimidazole in solution ranges from about 1 to about 20 percent by weight, based on the total weight of the solution. The quantity of modified polybenzimidazole dissolved in the solvent should be such that the resulting solution has a viscosity of about 50 to 4,000 poises at 30° C., and preferably from about 400 to about 600 poises.

More specifically, to prepare the modified polybenzimidazole, PBI is altered by phosphonylation or bromination sulfonation. In particular, PBI is subjected to a free radical aromatic phosphonylation reaction, where the resulting product is a polybenzimidazole phosphonate ester. The reaction involves a dialkyl phosphite ester [$(RO)_2P(O)H$] combined with a free radical generator, such as a benzoyl peroxide, di-tert-butyl peroxide, lauroyl peroxide, or 2,2'-Azobisisobutyronitrile (AIBN), where the dialkyl phosphonyl groups are attached to the backbone. N,N-dimethyl acetamide (DMAc), which is a good solvent for PBI, is also a mutual solvent for the dialkyl phosphite and the peroxide. Reactions are carried out in dilute solution ranging from about 1% to about 5% w/v, preferably between about 2% to 3% w/v, and most preferably in a dilute solution of 2.5% w/v, to prevent gelation of the reaction solution. Polymers that have either high or low phosphorus content can be produced depending on reaction stoichiometry. Low phosphorus content polymers contain between about 1% and 5% phosphorus and high phosphorus content polymers contain between about 10% and about 15% phosphorus.

High molecular weight PBI is subjected to free radical phosphonylation conditions by treating a solution of PBI in N,N-dimethyl acetamide (DMAc) or dimethyl sulfoxide (DMSO) with a dialkyl phosphite and a free radical generator such as benzoyl peroxide or di-tertbutyl peroxide at elevated temperatures such as about 85° C. to about 120° C. Proton nuclear magnetic resonance and infrared spectroscopy may be used to detect the presence of dialkyl phosphonate groups attached to the polymer backbone. The proton NMR spectrum, in addition to the peaks between 7 and 9 peaks per minute (ppm) corresponding to the aromatic protons, show broad peaks at 1.3 ppm and 4.2 ppm corresponding to $P(O)OCH_2CH_3$ and $P(O)OCH_2CH_3$, respectively, when diethyl phosphite is used in the reaction. Degrees of substitution of 0.3 (1 phosphonate group per 3 repeat units) to about 3.57 phosphonate groups per 2 repeat units) may be by proton NMR and elemental analysis. The infrared spectra of the polyphosphonate esters show strong absorptions at 1253 $cm^{-1}$ and 1031 $cm^{-1}$ indicative of P=O and P—O, respectively. Upon hydrolysis, the cleavage of the ethyl ester groups can be verified by NMR and the resulting polyphosphonic acid titrated with base.

Yet another embodiment of the invention relates to polymers having a high degree of phosphonylation, about a 10–15% phosphorus content. A large amount (60 molar equivalent per equivalent PBI repeat unit) of dialkyl phosphite mixed with benzoyl peroxide is added dropwise to a solution of PBI in DMAc at 120–125° C. to form a solution of 5% modified PBI. Small amounts, for example 50 mg, of dry benzoyl peroxide are then carefully added into 320 ml of 5% modified PBI in DMAc solution 10 times at 30 minute intervals. After the addition of the peroxide is complete, the mixture is maintained at about 120–125° C. for 2 hours. Dimethyl phosphite, $(CH_3O)_2P(O)H$, appears to react exothermally with benzoyl peroxide when these reactants are mixed, and thus, these reactants may be individually added to the solution. However, the mixing of diethyl phosphite, $(CH_3CH_2O)_2P(O)H$, with benzoyl peroxide does not appear to pose this particular problem.

In a further embodiment of the invention, phosphonylated PBIs with a low phosphorus content ranging from about 1% to about 5%, the reactants may be immediately added at room temperature to a solution of PBI in DMAc with heat applied after the reactants are thoroughly mixed with the PBI polymer. Alternatively, the peroxide and dialkyl phosphite may be dissolved together in methylene chloride and added dropwise over the course of 30 minutes to the PBI solution in DMAc while the solution is stirred vigorously at 110–150° C. Meanwhile, the methylene chloride may be distilled off and collected.

The polyphosphonate esters having a lower degree of phosphonylation may be hydrolyzed to form phosphonic acid by immersion in refluxing concentrated hydrochloric acid for at least one hour. The material remains soluble in trifluoroacetic acid but is not soluble in polar aprotic solvents. When immersed in metal hydroxide solution, such as lithium hydroxide, and thereby converted to the metal salt, the material dissolves in 50/50 vol./vol. mixtures of N,N-dimethyl acetamide (DMAc) or dimethyl sulfoxide with water in addition to trifluoroacetic acid. Strong films may be prepared by solution casting from trifluoroacetic acid solution.

Highly phosphonylated PBIs may be hydrolyzed with either trimethylsilyl bromide in chloroform or trimethylsilyl chloride/potassium iodide in N,N dimethyl formamide. This high charge density phosphorylated PBI may be cast into films by solution casting from aqueous sodium or lithium hydroxide solution (e.g., pH=8–9). Charge densities of the polymers may be determined by immersing small film samples (e.g., 20–100 mg) each in 15–20 mL aliquots of 1M sodium chloride solution and back titrating the released HCl with 0.1M sodium hydroxide solution. Films generally have charge densities between about 0.5 and about 9.5 meq $H^+/g$. Proton NMR spectra of highly diethylphosphonylated PBI gives: δ 1.25 (band, 6H, $P(O)(OCH_2CH_3)$, δ 4.2 (band, 3.7H, $P(O)OCH_2CH_3$), δ 7–9 (band, $\overline{2H}$, φ-H). $^1H$ NMR spectra of highly diethylphosphorylated PBI after hydrolysis gives: δ 7–9 (band, φ-H), peaks at 1.25 and 4.2 ppm disappear after hydrolysis.

In yet another embodiment, the modified PBI polymers of the invention used are modified polybenzimidazole-N-propane sulfonate (PBI-NPS). PBI-NPS is prepared as described by U.S. Pat. Nos. 4,814,399 and 5,599,639 and by Gieselman, M. B. and Reynolds, J. R. (*Macromolecules* 25: 4832–4834, 1992). More specifically, PBI-NPS is further modified by bromination and by the free radical phosphorylation reaction by techniques commonly known in the art. Bromination treatment of PBI-NPS improves fuel cell performance over the non-brominated polymer. PBI-NPS prior to and after bromination shows different charge densities when ion exchanged in 1M sodium chloride solution and the HCl released is back titrated with 0.1M sodium hydroxide. The sulfonated polymers typically give charge density values of about 1.0 meq $H^+/g$, where the brominated-sulfonated polymers give values of about 1.3 meq $H^+/g$ when titrated in this manner.

Another embodiment of the present invention relates to two PBI-N-propane sulfonates, $PBI-NPS_2$, having two N-propane sulfonate groups per repeat unit and $PBI-NPS_1$, having approximately one N-propane sulfonate group per repeat unit, with the following structures. These PBI-N-propane sulfonates that are subsequently phosphonylated and useful as fuel cell membranes and in other electrochemical applications. Phosphonylation of $PBI-NPS_2$ yields a water soluble product. $PBI-NPS_2$ and $PBI-NPS_1$ have the following chemical structure:

The N-propane sulfonated PBIs are described in U.S. Pat. Nos. 4,814,399 and 5,599,639. The present invention relates to the further modification of these polymers. In particular, these polymers may be further modified by bromination either heterogeneously in aqueous solution or homogeneously in solvents such as trifluoroacetic acid, to produce ion exchange membranes with, for example, improved fuel cell performance. Heterogeneous bromination of parent polybenzimidazole using aqueous bromine or bromine vapor has been described by Temin, S. C. (*J. Fire Flammability*, 3:19–28, 1972), as a fire retardant modification for PBI fibers. Different materials may be produced by subjecting PBI to one of the following series of reactions: phosphonylation, phosphonylation then bromination, sulfonation then bromination, or sulfonation then phosphonylation. The compounds produced are represented by the following formula:

where R is one or more of the following: $PO(OCH_2CH_3)_2$, $PO(OCH_3)_2$, $PO(OH)_2$, or Br. X is one or more of the following: H, alkyl, aryl, or $CH_2CH_2CH_2SO_3H$. The modified PBI has a number average molecular weight between about 2,000 Da and about 1,000,000 Da, preferably about 200 000 Da to about 500,000 Da.

In one embodiment, the phosphonylated polybenzimidazole comprises polyphosphonate esters having degrees of substitution ranging from 0.3 to 3.5. In particular, phosphonylated polybenzimidazoles having a degree of substitution ranging from 0.3 to 1.0 are soluble in polar aprotic solvents, such as N,N-dimethyl formamide; N,N-dimethyl acetamide; dimethyl sulfoxide; and acids: trifluoroacetic acid, concentrated sulfuric acid, and phosphoric acid. Furthermore, phosphonylated polybenzimidazoles having a degree of substitution ranging from 2.0 to 3.5 are soluble in lower alcohols, such as methanol, ethanol, isopropanol, and polar aprotic solvents, for example, N,N-dimethyl formamide, N,N-dimethyl acetamide, and dimethyl sulfoxide.

The solvents utilized to form the modified polybenzimidazole polymer solution of the invention include those solvents which are commonly recognized as being capable of dissolving typical unsubstituted polybenzimidazole polymers. For instance, the solvents may be selected from those commonly utilized including N,N-dimethylacetamide, N,N-dimethylformamide, dimethylsulfoxide, and N-methyl-2-pyrrolidone. Particularly preferred solvents are N,N-dimethyl acetamide (DMAc) and N,N-dimethylformamide. Additional representative solvents include formic acid, acetic acid, and sulfuric acid.

One suitable means for dissolving the polymer in solvent is by mixing the materials at a temperature above the normal boiling point of the solvent, for example, about 25° C. to 120° C. above such boiling point, and at a pressure of 2 to 15 atmospheres for a period of 1 to 5 hours under constant stirring. The resulting solution is preferably filtered to remove any undissolved polymer.

Another embodiment of the present invention relates to membranes comprising modified PBI. More particularly, the membrane comprises (a) phosphonylated; (b) brominated sulfonated; or (c) blended membranes, where the blended membranes comprise any combination with phosphonylated PBI.

When certain modified PBI polymers, as described herein, having (1) molecular weights greater than about 2,000 and less than about 1,000,000, preferably between about 200,000 and 500,000; and (2) an ion charge density greater than about 1.0 meq/g, preferably greater than about 1.7 meq/g, more preferably greater than about 2.0 meq/g, and less than about 3.9 meq/g, preferably less than about 3.5 meq/g, are blended with certain polysulfonic acids, electrolyte membranes having improved characteristics may be formed. Most preferred is a phosphonylated PBI having a charge density of 9 meq $H^+$/g. Specifically, the resultant membranes have enhanced selectivity, permeability, and mechanical strength. Moreover, the phosphonylated PBI polymers may be copolymerized or blended with other polymers.

Polymer blending is a simple, more feasible technology than methods that compound different polymer segments through copolymerization or the formation of interpenetrating materials. The blend membrane in this invention is a blend of modified PBI and a polysulfonic acid. For example, blended membranes may include a phosphonylated PBI and a polysulfonic acid, such as: (1) sulfonated poly(phenylene oxide) [SPPO]; (2) sulfonated poly ether sulfone [SPES]; or (3) sulfonated hexafluorobisphenol A polysulfone [$F_6$-SPS]. Lightly phosphonylated PBIs, or those having a low phosphorus content, may be hydrolyzed to the corresponding phosphonic acid upon refluxing with concentrated acid, preferably hydrochloric acid. Membranes composed of this material may be formed by solution casting from, for example, trifluoroacetic acid solution. PBI phosphonate esters that have a high degree of phosphonylation or a high phosphorus content are hydrolyzed with trimethylsilyl halide, trimethylsilyl bromide, or trimethylsilyl chloride and iodide. Suitable iodides include potassium iodide, lithium iodide, and sodium iodide. A ratio of trimethylsilyl chloride to iodide between about 1:1 and about 4:1 is employed. The resulting high charge density polymers have a charge density ranging between about 5 and about 10 meq $H^+$/g, preferably between about 7 and about 9 meq $H^+$/g, and are soluble in aqueous sodium or lithium hydroxide solutions. Once the polymer is dissolved in aqueous base, it may be precipitated by acidification of the solution. This precipitated polymer then may be redissolved in aqueous base.

The blend polymers are made by mixing phosphonylated polybenzimidazole in a solution containing a solvent and a polysulfonic acid also dissolved in one or more solvents. The blend membrane then is obtained by casting this mixed solution onto a clean glass surface by a Doctor knife (Gardner Lab, Inc.; Bethesda, Md.). The weight ratio of phosphonylated polybenzimidazole to the polysulfonic acid ranges from about 1:1 to about 1:20. The mechanical strength of the blend membrane can be further increased by radiation (gamma-ray and UV) and by thermal treatment. The blend membrane of the invention is easily bonded to the electrode when preparing the fuel cell assembly at room temperature without applying any pressure. This results in a good interface between the membrane and the electrode in the membrane electrode assembly without pre-exposure to a press at elevated temperatures (~120–150° C.), as is used with conventional membranes for the fuel cell.

In another embodiment, the modified polybenzimidazole may be used to make a polyelectrolyte membrane, where the modified polybenzimidazole has a degree of substitution ranging from 0.3 to 1.0 and is hydrolyzed at elevated temperatures ranging from about 60° C. to about 120° C., and preferably from about 80° C. to about 100° C., in acidic media, such as, concentrated hydrochloric acid, sulfuric acid, phosphoric acid, and TFA. In particular, modified polybenzimidazole having a degree of substitution ranging from 2.0 to 3.5 may be used to fabricate a polyelectrolyte membrane, where the membrane is hydrolyzed with a reagent such as trimethylsilyl halide; trimethylsilyl chloride and iodide, such as, potassium, lithium iodide, or sodium iodide; and trimethylsilyl bromide, where the ratio of trimethylsilyl chloride to iodide ranges from about 1:1 to about 4:1. The modified polybenzimidazole may have a degree of substitution between 0.3 and 1.0 and may be solution cast into membranes from trifluoroacetic acid solution upon hydrolysis. Furthermore, modified polybenzimidazole also may have a degree of substitution ranging from 2.0 to 3.5, and is soluble in aqueous base upon hydrolysis, and may be solution cast into membranes from aqueous bases, such as, aqueous sodium hydroxide and aqueous lithium hydroxide solution upon hydrolysis.

Another embodiment of the present invention relates to a polyelectrolyte membrane, where the modified polybenzimidazole has a degree of substitution ranging between 2.0 and 3.5, is solution cast into membranes from aqueous base, and is ion exchanged in dilute acid solution without dissolving. Once the membrane is ion exchanged into $H^+$ form, it is insoluble in neutral water at a temperature ranging from room temperature to boiling, about 25° C. to about 100° C. The membrane can redissolve upon the addition of base having a pH of at least 8, ranging from about 8 to about 11, and preferably from about 8 to about 9, and where aqueous solutions may optionally be boiled for several hours and recast into films. For example, the membrane can redissolve at room temperature for 1–5 hours with stirring or for 1–3 hours at elevated temperatures in basic solution should gel particles be present.

One embodiment of the invention relates to a membrane comprising a further modified polybenzimidazole having a degree of substitution between 0.3 and 1.0, hydrolyzed at elevated temperatures in acidic media, such as trifluoroacetic acid and HCl, where the fabricated membrane may be further treated with bromine to alter the properties of the membrane.

Another embodiment of the present invention relates to a blend membrane comprising phosphonylated PBI and a polysulfonic acid, such as sulfonated poly(phenylene oxide) [SPPO]; sulfonated poly ether sulfone [SPES]; and sulfonated hexafluorobisphenol A polysulfone [$F_6$-SPS]. The blended polymer has a weight ratio of phosphonylated PBI to polysulfonic acid, such as sulfonated PBI, and polysulfonic acid to phosphonylated PBI ranging between about 1:1 and about 1:20, and may be prepared by the steps comprising: (a) separately dissolving phosphonylated polybenzimidazole and sulfonated polybenzimidazole polymers in their respective solvents; (b) mixing polymer solutions together in a weight ratio of phosphonylated PBI and sulfonated PBI ranging between about 1:1 and about 1:20 to form a blend solution; (c) casting said blend solution onto a clean surface; and (d) drying the cast blend solution for a time sufficient to evaporate the solvent and form a dry blend membrane. The blend membrane may have a concentration of polymers in solution ranging between about 1 and about 23 weight percent and a thickness of at least about 1 micrometer, preferably at least about 10 micrometers, and most preferably about 100 micrometers, and a thickness below about 250 micrometers, preferably below about 150 micrometers, and most preferably below about 50 micrometers. A particular blend membrane may be heat-treated at a temperature ranging between about 25° C. and about 120° C., at least about 1 psig, preferably at least about 10 psig, and most preferably about 50 psig, and below about 100 psig, preferably below about 75 psig, and more preferably below about 25 psig with $O_2/H_2$ reactant gases, for about 1 hour to about 5 hours. The dry blend membrane may be cast to have a thickness of at least about 1 micrometer, preferably at least about 10 micrometers, and most preferably about 100 micrometers, and a thickness below about 250 micrometers, preferably below about 150 micrometers, and most preferably below about 50 micrometers. The blend membrane may be further brominated by immersion into aqueous bromine, where the aromatic rings of the blend membrane are brominated.

Yet another aspect of the present invention relates to methods of using modified PBIs in PEM fuel cells at high temperatures ranging from about 60° C. to about 120° C. and preferably from about 85° C. to about 100° C. Table 1 and Table 2 show the properties and performance of modified PBIs and modified PBI blends in fuel cells at varying conditions. Fuel cells comprising modified PBI membranes or modified PBI blend membranes have current densities ranging from about 0.5 A/cm$^2$ to about 2.5 A/cm$^2$ with a minimum catalyst loading equivalent ranging between about 0.1 mg/cm$^2$ and about 0.3 mg/cm$^2$ of platinum on a platinum/carbon polytetrafluoroethylene electrode at least about 1 psig, preferably at least about 10 psig, and most preferably about 50 psig, and below about 100 psig, preferably below about 75 psig, and most preferably below about 25 psig with $O_2/H_2$ reactant gases.

A further embodiment of the invention relates to a process for preparing a polymer electrolyte membrane suitable for use in fuel cells, the process comprising: (a) dissolving the polymer in a suitable solvent, such as dimethyl sulfoxide, N,N-dimethyl acetamide, N,N-dimethyl formamide, acids: trifluoroacetic acid, concentrated sulfuric acid, phosphoric acid, and lower alcohols: methanol, ethanol, and isopropanol; (b) adding a modifying reagent to form a modified solution; (c) casting said modified polybenzimidazole solution onto a clean surface; and (d) drying the cast modified polybenzimidazole solution for a time sufficient to evaporate the solvent and form a dry polymer polyelectrolyte membrane, wherein said polyelectrolyte membrane may be used in fuel cells.

Besides polybenzimidazoles, other thermally stable aromatic polymers, such as polyoxadiazoles, polybenzothiazoles, polybenzoxazoles, polyimides, polyquinoxalines, polybenzoxazinones, and polydithiazoles, may be useful as PEM fuel cell electrolytes and in electrochemical applications.

The following are non-limiting examples of synthetic procedures used in the invention.

EXAMPLE 1

PBI (4.2 g or 0.0136 mole) was dissolved in 178 mL of N,N-dimethyl acetamide (DMAc) under a gentle nitrogen stream in a 500 mL, 3 necked flask fitted with a nitrogen inlet, a 125 mL dropping funnel, condenser, and a thermometer, forming a solution of PBI. The DMAc used was initially distilled through nitrogen from calcium hydride at atmospheric pressure. Refluxing was typically required to completely dissolve the PBI. When dissolution was complete the temperature was allowed to fall to 110° C. Benzoyl peroxide (17.1 g or 0.07 mole) and diethyl phosphite (13.5 mL or 0.1047 mole in 63 mL of methylene chloride) were added to the dropping funnel. The diethyl phosphite used was first vacuum distilled from calcium hydride at 60° C., where the middle 80% was collected. The benzoyl peroxide and diethyl phosphite solutions were added dropwise to the PBI solution while the temperature of the PBI solution was maintained at 110° C.–115° C. with vigorous stirring. Approximately 13–15 mL of the benzoyl peroxide and diethyl phosphite solutions were added during a 5 minute period. Addition was completed within 30 minutes. When addition first began, the light brown PBI solution turned darker brown, but after a few minutes lightened to an orange-brown color. After the addition of benzoyl peroxide and diethyl phosphite a modified PBI solution was formed and maintained at 115° C. for an additional 90 minutes. A light nitrogen purge was also maintained throughout the duration of the reaction. Methylene chloride was vaporized, distilled off, and collected. When the reaction was com- pleted and the modified PBI solution was cooled, the modified PBI solution was poured into acetone. The precipitated modified PBI was then filtered off. It is important to remove any unreacted peroxide. After drying the precipitate, 5.99 g of a light orange-brown material, soluble at room temperature in N,N-dimethyl acetamide and dimethyl sulfoxide, resulted. Proton NMR indicated that about 1 diethyl phosphonyl group per 3 PBI repeat units corresponded to a degree of substitution of 0.33.

Proton NMR showed about 2 diethyl phosphonyl groups per 3 PBI repeat units or a degree of substitution of 0.67. Upon hydrolysis, the charge density was about 1.8 meq H$^+$/g, as determined by titration.

EXAMPLE 3

PBI (0.25 g or $8.12 \times 10^{-4}$ mole) was dissolved in 26 mL N,N-dimethyl acetamide under a gentle nitrogen stream in a

R=P(O)(OCH$_2$CH$_3$)$_2$

Upon hydrolysis of the ethyl groups, a polyphosphonic acid with a charge density of 1.99 meq H$^+$/g and 3.1% phosphorus resulted. After the material was subjected to hydrolysis in concentrated hydrochloric acid for one hour, the charge density was 2.07 meq H$^+$/g by titration. Elemental analysis revealed 2.37% phosphorus.

EXAMPLE 2

PBI (0.13 g or $4.22 \times 10^{-4}$ mole) was dissolved in 7 mL N,N-dimethyl acetamide under a gentle nitrogen stream in a 50 mL 3 necked flask fitted with a nitrogen inlet, a condenser and, a thermometer, forming a solution of PBI. When dissolution was completed and the PBI solution was cooled to room temperature, 0.8 mL ($6.20 \times 10^{-3}$ mole) diethyl phosphite and 1.0 g ($4.13 \times 10^{-3}$ mole) benzoyl peroxide were added directly to the solution of PBI. After thorough mixing, the PBI solution, now containing diethyl phosphite and benzoyl peroxide, was heated to 130° C. over the course of about 7 minutes with constant vigorous stirring. Once the reaction temperature reached 130° C., this temperature was maintained for one hour. The modified PBI was isolated by pouring the reaction mixture into acetone and filtering off the precipitated modified PBI.

50 mL 3 necked flask fitted with a nitrogen inlet, a condenser, and a thermometer, forming a solution of PBI. Diethyl phosphite (2.0 mL or 0.0 155 mole) mixed with benzoyl peroxide (1.96 g or $8.10 \times 10^{-4}$ mole in 10 mL DMAc) were added directly to the PBI solution at room temperature. After thorough mixing, the PBI solution, now containing diethyl phosphite mixed with DMAc and benzoyl peroxide, was heated to 120° C. under nitrogen with constant stirring over the course of 7 minutes. The modified PBI solution containing diethyl phosphite and benzoyl peroxide was maintained at 120° C. for 45 minutes. After 45 minutes, some of the modified PBI had precipitated. The remaining modified PBI solution was then poured into acetone, and the precipitated modified PBI was filtered off. Precipitated modified PBI was dissolved in trifluoroacetic acid. Since the precipitate dissolved completely in trifluoroacetic acid, the precipitate was not crosslinked. In addition to dissolving in TFA, precipitated modified PBI was found to dissolve in DMAc treated with triethylamine. Upon hydrolysis of the modified PBI, the charge density was about 1.39 meq H$^+$/g, as determined by titration.

EXAMPLE 4

PBI (0.49 g or $1.59 \times 10^{-3}$ mole) was dissolved in 20 ml dimethyl sulfoxide under a gentle nitrogen stream in a 50 mL 3 necked flask fitted with a nitrogen inlet, a condenser, and a thermometer, forming a solution of PBI. With the PBI

R=P(O)(OCH$_2$CH$_3$)$_2$

The resulting modified PBI (~0.18 g) was a light orange material and demonstrated good solubility in N,N-dimethyl acetamide and dimethyl sulfoxide and swelled in methanol.

solution at room temperature, 3.0 mL (0.0232 mole) diethyl phosphite and 2.9 mL (0.0158 mole) of di-tertbutyl peroxide were added directly to the PBI solution. After thorough mixing, the PBI solution, now containing diethyl phosphite and ditertbutyl peroxide and forming a modified PBI solution, was heated to 130° C. under nitrogen with constant stirring and maintained at 130° C. for 15 minutes. The modified PBI solution was then cooled over the course of 10 minutes. The modified PBI solution was then poured into acetone, and the precipitated modified PBI was filtered off. The charge density was about 0.73 meq H+/g, as determined by titration.

EXAMPLE 5

The PBI phosphonate ester from Example 1 was hydrolyzed by refluxing in concentrated hydrochloric acid for at least 1 hour. The resulting modified PBI (5 g) has the following structure:

R=P(O)(OH)$_2$

The modified PBI was treated with bromine by dissolving 1.05 g of the modified PBI in 15.3 g (or 10 ml) trifluoroacetic acid in a small flask, forming a solution of modified PBI. Bromine (0.25 g or 1.56×10 mole) was added to this modified PBI solution with vigorous stirring or agitation and maintained for 25 minutes. Gelation may be observed. The bromine-treated modified PBI solution was poured into deionized water, and the precipitated bromine-treated modified PBI was filtered off. The charge density of the bromine-treated modified PBI having the following chemical structure was around 1.76 meq H+/g, as determined by titration.

EXAMPLE 6

A modified, phosphonylated polybenzimidazole (PBI) having a higher degree of phosphonylation and higher charge density than that obtained in Example 1 was prepared using larger quantities of reactants. N,N-dimethyl acetamide (DMAc) used in the reaction was distilled through nitrogen from calcium hydride at atmospheric pressure. The diethyl phosphite used, as described herein, was vacuum distilled from calcium hydride at 60° C., where the middle 80% was collected.

In a typical reaction, PBI (5 g or 0.016 mole) was dissolved in 200 mL N,N-dimethyl acetamide under a gentle nitrogen stream in a 500 mL 3 necked flask fitted with a nitrogen inlet, a 500 mL dropping funnel, a thermometer, and a nitrogen outlet nozzle fitted to the top of the dropping funnel, forming a solution of PBI. Refluxing was required to completely dissolve the PBI. When dissolution of PBI was complete, the temperature was allowed to fall to 125° C. Benzoyl peroxide (19.5 g or 0.08 mole) and diethyl phosphite (125 mL or 0.969 mole) were added to the PBI solution through the dropping funnel over the course of 30 minutes. Meanwhile, the temperature of the PBI solution now containing diethyl phosphite and benzoyl peroxide was maintained at 120–125° C. with vigorous stirring.

After the addition of the diethyl phosphite and benzoyl peroxide solution was completed a second 19.5 g portion of dry benzoyl peroxide was added to the PBI solution containing diethyl phosphite and benzoyl peroxide over the course of 5–10 minutes in 0.5–1.0 g portions through a flask joint with the thermometer removed. The nitrogen inlet was left intact to keep the solution blanketed with nitrogen during the addition. After 30 minutes, a third portion of 19.5 g benzoyl peroxide was added and after another 30 minutes a fourth portion was added in a similar manner. During the addition, the temperature of the solution may rise to around 140° C. and care should be taken to add the solid peroxide slowly enough as to not allow the temperature to rise any higher. Bubbling may also occur. After the additions of peroxide, the modified PBI solution containing benzoyl peroxide and diethyl phosphite was maintained at 120–125° C. for an additional 2 hours under nitrogen with stirring. Afterward the modified PBI solution containing benzoyl peroxide and diethyl phosphite was poured into a mixture of acetone/hexane 50/50 by volume to precipitate the modified PBI. The precipitated modified PBI was filtered off. Purification occurred by dissolving the precipitate in methylene chloride and reprecipitating into pentane. The isolated modified PBI weighed 21.3 g. Proton NMR and elemental analysis of the modified PBI revealed about 3.5 degrees of substitution corresponding to an elemental analysis of 13.79% phosphorus.

R=P(O)(OCH$_2$CH$_3$)$_2$,P(O)(O)$_2$

To hydrolyze the PBI phosphonate ester, illustrated in the above structure, 19 g were dissolved in 200 mL dry N,N-dimethyl formamide (DMF) in a 500 mL 3 neck flask fitted with a nitrogen inlet nozzle, a condenser, and a thermometer, forming a solution of PBI phosphonate ester. Under nitrogen gas, trimethylsilyl chloride (41 mL or 0.324 mole) was added dropwise after which 54 g (0.324 mole) potassium iodide was added to the stirred PBI phosphonate ester solution. The PBI phosphonate ester solution, containing trimethylsilyl chloride and potassium iodide, was then heated to 85–90° C. for 90 minutes. Afterward, deionized water was added to the solution precipitating the modified PBI. The precipitated modified PBI was then vacuum filtered and washed with deionized water and then acetone. After suction drying, 13.7 g of the modified PBI was obtained. Titration of the modified PBI indicated a charge density of 9.4 meq H$^+$/g. Elemental analysis indicated 14.9% phosphorus.

EXAMPLE 7

Bromination of N-propane sulfonated PBI (PBI-NPS$_2$) was carried out by immersing a trifluoroacetic acid cast film of PBI-NPS$_2$ in a large excess of saturated aqueous bromine for 24 hours. After immersion in aqueous bromine, the film was rinsed in a large excess of fresh deionized water for 24 hours. Elemental analysis revealed 34% bromine and 7.34% sulfur. Proton NMR was consistent with the following structure:

EXAMPLE 8

N-propane sulfonated PBI (PBI-NPS; 1.04 g or 1.84×10$^{-3}$ mole) was dissolved in 50 mL dimethyl sulfoxide under a gentle nitrogen stream in a 250 mL 3 necked flask fitted with a nitrogen inlet, condenser, and a thermometer, forming a solution of PBI-NPS. At room temperature, diethyl phosphite (3.6 mL or 0.0279 mole) was added to the PBI-NPS solution along with di-tert-butyl peroxide (3.4 mL or 0.0185 mole). The PBI-NPS solution, now containing diethyl phosphite and di-tert-butyl peroxide, was heated slowly to 130° C. under nitrogen with vigorous stirring. The modified PBI-NPS solution was maintained at 130° C. for 1 hour. After 1 hour the modified PBI-NPS was poured into acetone, and the precipitated modified PBI-NPS was filtered off. The modified PBI-NPS has the following chemical structure. Proton NMR spectroscopy indicated the addition of about 2 phosphonate groups per 3 repeat units.

R=P(O)(OCH$_2$CH$_3$)$_2$

EXAMPLE 9

PBI-NPS (1.0 g or 1.77×10$^{-3}$ mole) was dissolved in a mixture of 50 mL N,N-dimethyl acetamide and 10 mL water under a gentle nitrogen stream in a 250 mL 3 necked flask fitted with a nitrogen inlet, condenser, and a thermometer, forming a solution of PBI-NPS. At room temperature, diethyl phosphite (6 mL or 0.046 mole) was added to the PBI-NPS solution along with di-tert-butyl peroxide (2 mL or 0.011 mole). The PBI-NPS solution, now containing diethyl phosphite and di-tert-butyl peroxide, was then heated to 117° C. under nitrogen with vigorous stirring, forming a modified PBI-NPS solution. The modified PBI-NPS solution was maintained at 117° C. for 1.5 hours. After 1.5 hours, some of the modified PBI-NPS solution precipitated. The remaining modified PBI-NPS solution was poured into acetone and precipitated, filtering off the remaining modified PBI-NPS. A charge density of 1.28 meq H$^+$/g was obtained by titration.

EXAMPLE 10

PBI-NPS$_1$ (1.46 g or 3.35×10$^{-3}$ mole) was dissolved in 70 mL dimethyl sulfoxide under a gentle nitrogen stream in a 250 mL 3 necked flask fitted with a nitrogen inlet, a condenser, and a thermometer, forming a sulfonated PBI-NPS$_1$ solution. At room temperature, diethyl phosphite (6.6 mL or 0.0511 mole) was added to the sulfonated PBI-NPS$_1$ solution along with di-tert-butyl peroxide (6.4 mL or 0.0349 mole). The sulfonated PBI-NPS$_1$ solution, now containing diethyl phosphite and di-tert-butyl peroxide, was then heated slowly to 130° C. under nitrogen with vigorous stirring, forming a modified PBI-NPS$_1$ solution. The modified PBI-NPS$_1$ solution was maintained at 130° C. for 1 hour. After 1 hour, the modified PBI-NPS$_1$ solution was poured into acetone and precipitated, filtering off the modified PBI-NPS$_1$. Proton nuclear magnetic resonance spectroscopy indicated that about 1 phosphonate group per repeat unit was added. Upon hydrolysis with heated concentrated HCl, the charge density was about 0.92 meq H$^+$/g, as determined by titration. After treatment with aqueous bromine, the charge density of the modified PBI-NPS$_1$ increased to about 1.59 meq H$^+$/g.

EXAMPLE 11

A light orange-brown phosphonated PBI (PBIP), the product of Example 1, was dissolved in trifluoroacetic acid to form a 15 weight percent (wt %) solution. This PBIP solution was centrifuged. The clear PBIP solution was poured onto a clear glass plate surface and cast by a Doctor knife. The PBIP-covered glass was then placed in a chamber for at least 48 h to evaporate the trifluoroacetic acid. The final membrane containing PBIP was a dry, transparent, light yellow film with a 40 μm thickness. The ICD of the PBIP membrane was 2.07 meq H$^+$/g. The conductivity of this membrane was 0.142 S/cm at 80° C.

The PBIP membrane was placed into 0.5 M sulfuric acid for 0.5 h, then the membrane was dried with KIMWIPES® (Roswell, Ga.) and placed between and in contact of two Pt (Pt loading was 0.17 mg/cm$^2$) carbon-PTFE fuel cell electrodes without application of pressing or elevated temperature. The PEM fuel cell (5 cm$^2$) was tested at 90° C., at 30 psig with O$_2$/H$_2$ as the reactant gases. It had an open cell voltage of 0.9 V and the fuel cell had a current density of 0.5A/cm$^2$ at 0.3V.

EXAMPLE 12

The same procedure as employed in Example 11 was used except that the membrane was cast from the modified PBI of Example 2. The current density exhibited by this PEM fuel cell was 0.8 A/cm$^2$ (0.3V) at 90° C.

EXAMPLE 13

The same procedure as employed in Example 11 was used except that the membrane was cast from the modified PBI of Example 5. The conductivity of this membrane was 0.062 S/cm at 80° C. The current density at 90° C. exhibited by this PEM fuel cell was 1.0A/cm$^2$ at 0.2 V.

EXAMPLE 14

Figure 1:
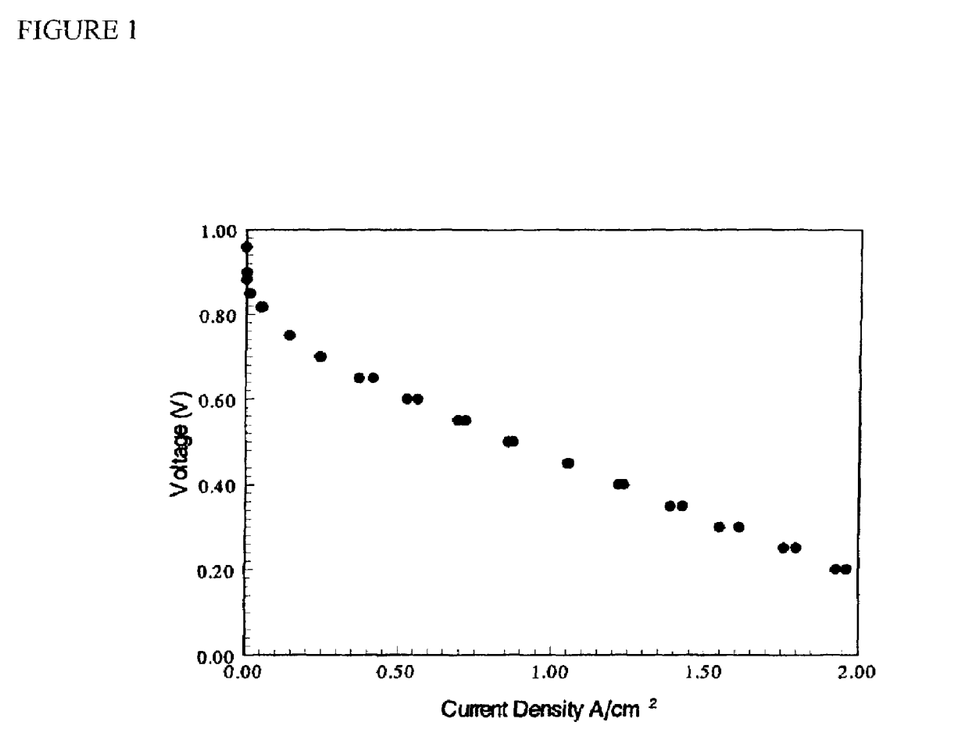
FIG. 1 shows a polarization graph of a fuel cell assembly having a membrane as described in Example 6 and a platinum (Pt)-carbon/polytetrafluoroethylene (PTFE_electrode (Pt loading is 0.17 mg/$cm^2$) operating at 110° C., 30 psig, and having a cell area of 5 $cm^2$, as described in Example 14.

The same procedure as employed in Example 11 was used except that the membrane was cast from the modified PBI of Example 6. FIG. 1 shows the polarization curves for a fuel cell with this membrane at 110° C., 30 psig. It had an open cell voltage 0.98V and the fuel cell had a current density of 2.0 A/cm$^2$ at 0.2V.

EXAMPLE 15

Figure 2:
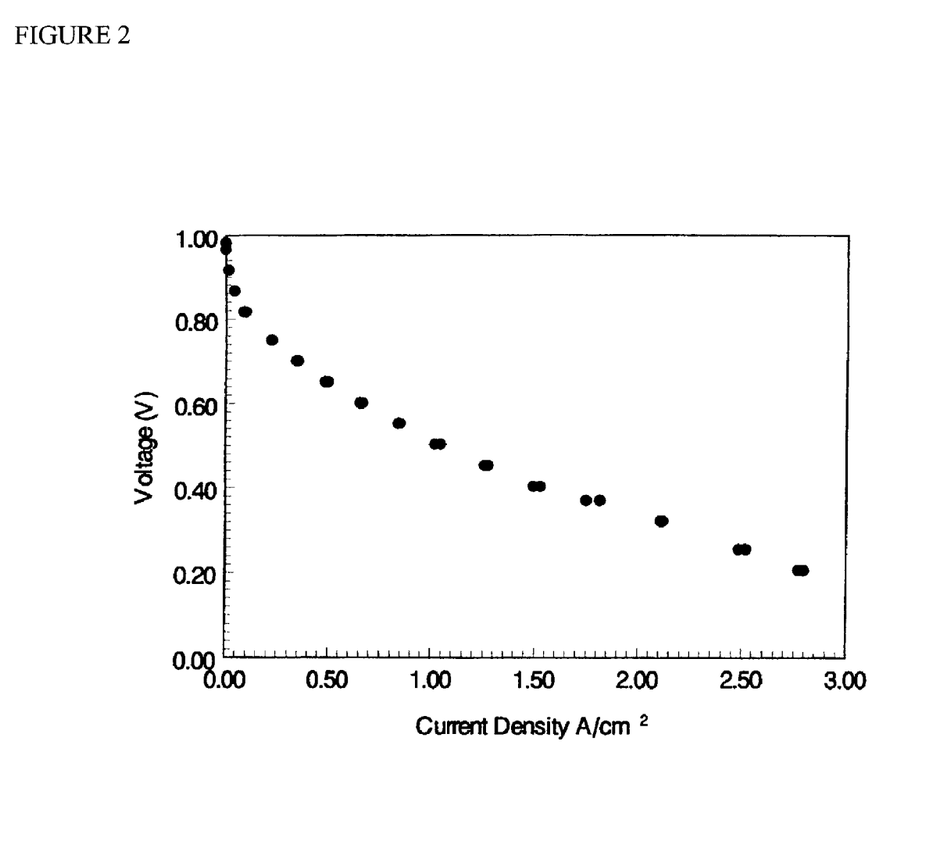
FIG. 2 shows a polarization graph of a fuel cell assembly having a membrane as described in Example 7 and a platinum (Pt)-carbon/polytetrafluoroethylene (PTFE) electrode (Pt loading is 0.17 mg/$cm^2$) operating at 90° C., 30 psig, and having a cell area of 5 $cm^2$, as described in Example 15.

The same procedure as employed in Example 11 was used except that the membrane was cast from the modified PBI-NPS of Example 7. The conductivity of this membrane was 0.172 S/cm$^2$ at 80° C. FIG. 2 shows the polarization curves for a fuel cell with this membrane at 80° C., 30 psig. It had an open cell voltage 1.0V and at 0.3V and the fuel cell had a current density of 2.5 A/cm$^2$. Mass transfer limitations of flooding was not observed at this current.

EXAMPLE 16

The same procedure as employed in Example 11 was used except that the membrane was cast from the modified PBI-NPS of Example 9. The conductivity of this membrane was 0.068 S/cm at 80° C. The current density at 90° C. exhibited by this PEM fuel cell was 0.9A/cm$^2$ at 0.3 V.

EXAMPLE 17

A light orange-brown phosphonylated PBI, the product of Example 1, was hydrolyzed and dissolved in trifluoroacetic acid (TFA) to form a 15 wt % solution of PBIP-TFA. A 15 wt % of PBI-NPS$_2$ in TFA was prepared separately. Then 4 g of PBI-TFA solution and 4 g of PBI-NPS$_2$ solution were blended by mixing the two solutions at room temperature for at least 1 h. This blend contained a 50:50 weight ratio of the two polymers, i.e. PBIP-TFA and PBI-NPS$_2$. This blend solution was then centrifuged. The clear blend solution was poured onto a glass plate surface and cast by a Doctor knife. The blend solution-covered glass plate was then placed in a chamber for at least 48 h to evaporate the trifluoroacetic acid, forming a blend membrane comprising PBIP-TFA and PBI-NPS$_2$. The conductivity of this blend membrane was 0.10 S/cm.

The blend membrane was immersed in 0.5 M sulfuric acid for 0.5 h, then dried with KIMWIPES®, and placed between and in contact with two Pt (Pt loading was 0.17 mg/cm$^2$) carbon-PTFE fuel cell electrodes without pressing or elevated pressure and at room temperature. The PEM fuel cell (5 cm$^2$) was tested at 90° C., at 30 psig with O$_2$/H$_2$ as the reactant gases. It had an open cell voltage of 0.92 V and at 0.3 V, and the fuel cell had a current density of 1.0 A/cm$^2$.

EXAMPLE 18

The same procedure as employed in Example 17 was used except that the weight ratio of PBIP:PBI-NPS$_2$ was 30:70. The conductivity of this blend membrane was 0.154 S/cm. The PEM fuel cell containing this blend membrane was tested at a temperature ranging from about 70° C. to about 120° C. and 30 psig. The I-V polarization exhibited by the PEM fuel cell was 0.8A/cm$^2$ at 0.3V, 90° C.

EXAMPLE 19

The same procedure as employed in Example 17 was used except that the weight ratio of PBIP:PBI-NPS$_2$ was 70:30. The conductivity of this blend membrane was 0.047 S/cm and I-V polarization exhibited by the PEM fuel cell containing this blend membrane was 0.5A/cm$^2$ at 0.3V, 90° C.

EXAMPLE 20

A light orange-brown phosphonylated PBI, the product of Example 1, was dissolved in trifluoroacetic acid to form a 15 wt % solution of phosphonylated PBI. A 15 wt % solution of PBI-NPS$_2$ in TFA was prepared separately. Then 4 g of PBIP/TFA phosphonylated PBI solution and 4 g of the PBI-NPS$_2$ solution were blended by mixing the two solutions at room temperature for at least 1 h. This blend solution had 50:50 weight ratio of the phosphonylated PBI:PBI-NPS$_2$. This blend solution was then centrifuged, resulting in a clear solution containing phosphonylated PBI and PBI-NPS$_2$, which was then poured onto a glass plate surface and cast by a Doctor knife. The phosphonylated PBI:PBI-NPS$_2$ covered glass plate then was placed in a chamber for at least 48 h to evaporate the trifluoroacetic acid, forming a blend film or membrane. This blend film or membrane then was immersed in a large excess of saturated aqueous bromine for 24 hours. After immersing in aqueous bromine, the blend membrane was rinsed in a large excess of fresh deionized water for 24 hours.

The blend membrane was placed in 0.5 N sulfuric acid for 0.5 h forming a sulfonated blend membrane. The membrane was dried with KIMWIPES® and placed between and in contact with two Pt (Pt loading was 0.17 mg/cm$^2$) carbon-PTFE fuel cell electrodes without pressing or elevated pressure while at room temperature. The conductivity of this blend membrane was 0.04 S/cm. The PEM fuel cell (5 cm$^2$) containing this blend membrane was tested at 90° C., at 30 psig with O$_2$/H$_2$ as the reactant gases. It had an open cell voltage of 1.0 V and at 0.3 V, and the fuel cell had a current density of 1.2A/cm$^2$.

EXAMPLE 21

A solution of 5% PBIP, the result of Example 6, and a 20% solution of sulfonated poly(phenylene oxide), SPPO, (4.6 meq H$^+$/g) in water was separately prepared. Addition of sodium hydroxide to the PBIP/water slurry, pH=8–9, was required for dissolution of the high charge density PBIP. Eighteen grams (~18 ml) of the 5% PBIP solution was mixed with 0.5 g (~0.5 ml) of the 20% aqueous solution of SPPO, forming a PBIP-SPPO blend solution. No cloudiness was observed. After centrifugation, this PBIP-SPPO blend solution was cast onto flat glass and spread with a Doctor knife with the gap set at 1.4 mm. The blend solution was allowed to dry for 24 hours forming a blend membrane of PBIP-SPPO. The dry blend membrane was then wet with 0.5 N sulfuric acid before being taken off the glass and was ion exchanged in a large excess of 0.5 N sulfuric acid forming a sulfonated blend membrane. This PBIP-SPPO blend membrane contained a 90:10 ratio of PBIP:SPPO by weight.

Figure 3:
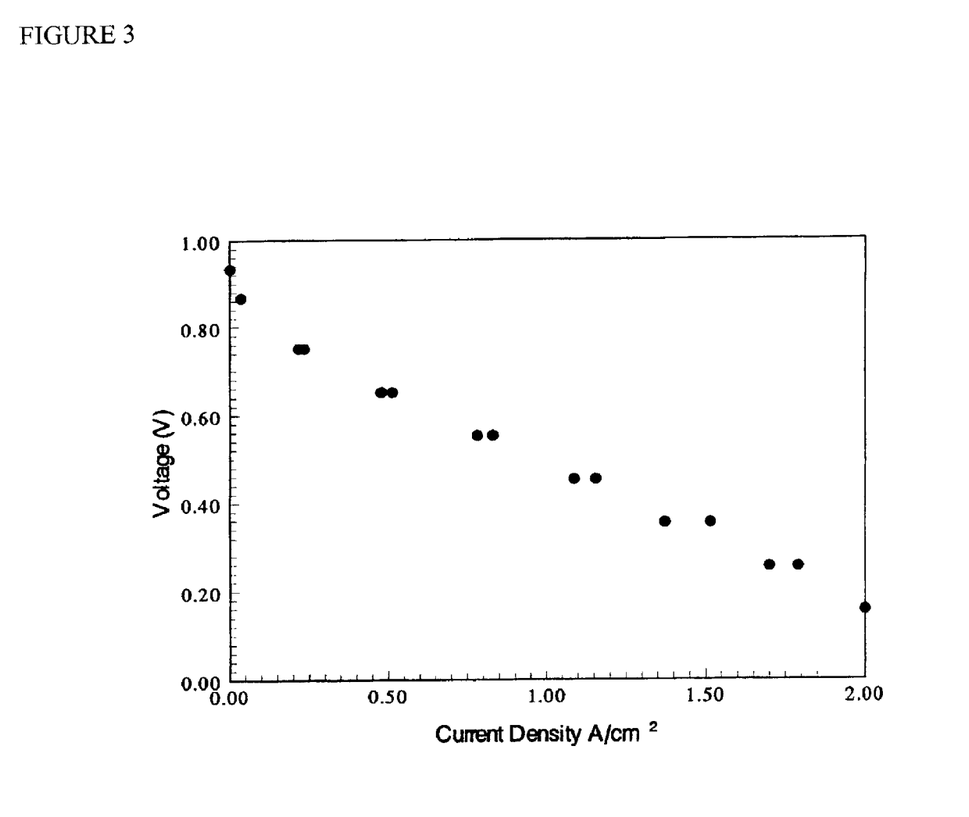
FIG. 3 shows a polarization graph of a fuel cell assembly having a membrane as described in Example 21 and a platinum (Pt)-carbon/polytetrafluoroethylene (PTFE) electrode (Pt loading is 0.17 mg/$cm^2$) operating at 100° C., 30 psig, and having a cell area of 5 $cm^2$.

More specifically, the PBIP-SPPO blend membrane was immersed in 0.5 N sulfuric acid for at least one day. A fuel cell was assembled by placing the sulfonated PBIP-SPPO blend membrane between and in contact with two Pt (Pt loading was 0.2 mg/cm$^2$) carbon-PTFE electrodes without pressing or elevated pressure. The PEM fuel cell (5 cm$^2$) containing the PBIP-SPPO blend membrane was tested with $O_2/H_2$ reactant gases. FIG. 3 shows the polarization curves of this PBIP-SPPO blend membrane fuel cell at 100° C. and 30 psig. The fuel cell containing this blend membrane had a current density of 1.8A/cm$^2$ at 0.2 V. The conductivity of this PBIP-SPPO blend membrane was 0.11S/cm.

EXAMPLE 22

Figure 4:
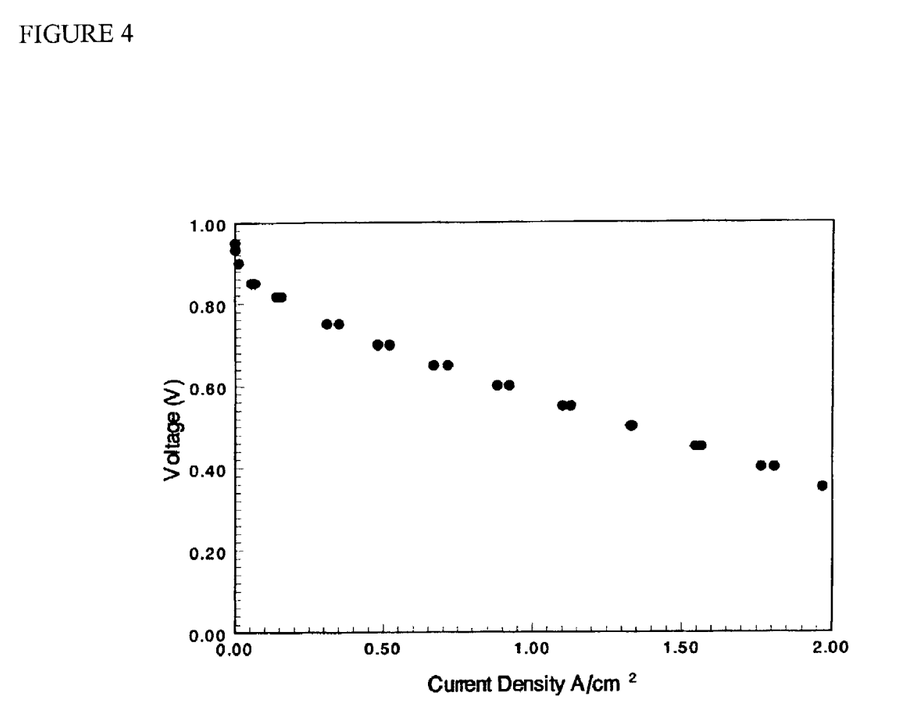
FIG. 4 shows a polarization graph of a fuel cell assembly having a membrane as described in Example 22, and a platinum (Pt)-carbon/polytetrafluoroethylene (PTFE) electrode (Pt loading is 0.17 mg/$cm^2$) operating at 100° C., 30 psig, and cell area of 5 $cm^2$.

A solution of 5% PBIP, the result of Example 6, and a 20% solution of sulfonated hexafluorobisphenol A polysulfone ($F_6$-SPS) (3.21 meq H$^+$/g) in water were separately prepared. Addition of sodium hydroxide to the PBIP/water slurry, pH=8–9, was required for dissolution of the high charge density PBIP forming a solution of PBIP. Eighteen grams of the 5% PBIP solution was mixed with 0.5 g of the 20% aqueous solution of $F_6$-SPS. No cloudiness was observed. After centrifugation, this blend solution now containing PBIP and $F_6$-SPS, was cast onto flat glass and spread with a Doctor knife with the gap set at 1.4 mm. The blend solution was allowed to dry for 24 hours forming a blend membrane. This PBIP-$F_6$-SPS blend membrane contained a 90:10 ratio of PBIP:$F_6$-SPS. The dry blend membrane was then wet with 0.5 N sulfuric acid before being taken off the glass and was ion exchanged in a large excess of 0.5 N sulfuric acid. FIG. 4 shows the polarization curves of this blend membrane fuel cell operating at 100° C. and 30 psig. The open cell voltage was 0.98 V, and as can be seen from FIG. 4, the fuel cell containing this blend membrane had a current density of 2.0 A/cm$^2$ at 0.4 V. The conductivity of this PBIP-$F_6$-SPS blend membrane was 0.056 S/cm.

EXAMPLE 23

Figure 5:
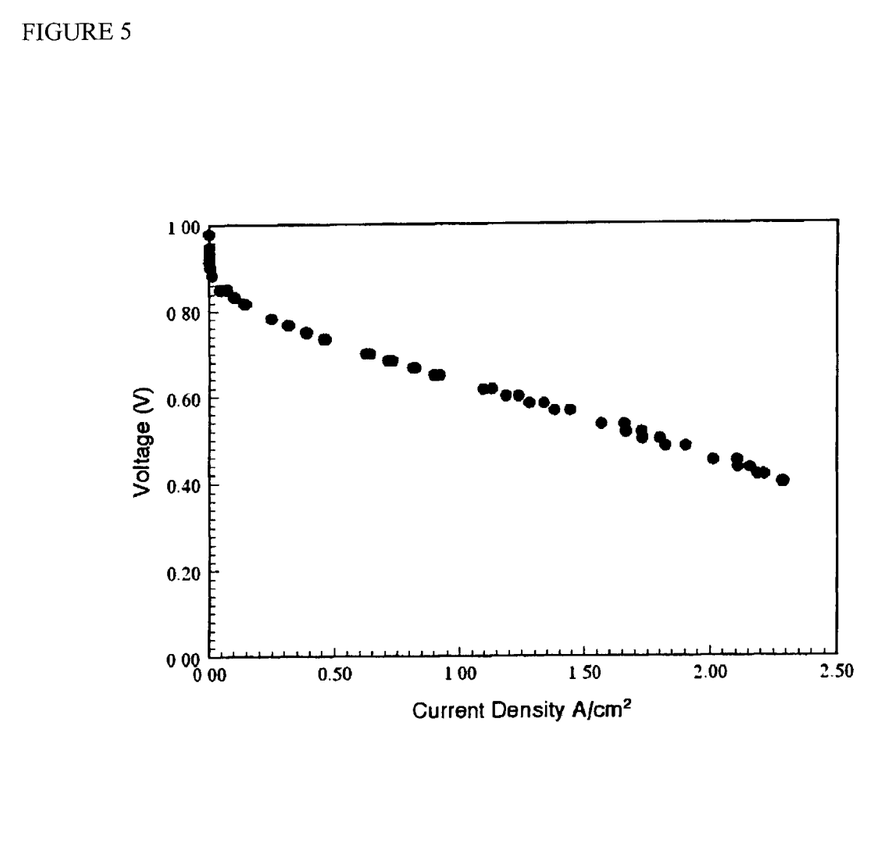
FIG. 5 shows a polarization graph of a fuel cell assembly having a membrane as described in Example 23, and a platinum (Pt)-carbon/polytetrafluoroethylene (PTFE) electrode (Pt loading is 0.17 mg/$cm^2$) operating at 95° C., 30 psig, and cell area of 5 $cm^2$.

A solution of 5% PBIP in aqueous sodium hydroxide, the product of Example 6, and a 20% solution of sulfonated hexafluorobisphenol A polysulfone ($F_6$-SPS) (1.91 meq H$^+$/g) in methanol were separately prepared. Addition of sodium hydroxide to the PBIP/water slurry, pH=8–9, was required for dissolution of the high charge density PBIP forming a solution of PBIP. Ten grams of the 5% PBIP solution was mixed with 0.6 g of the 20% solution of $F_6$-SPS, forming a blend solution of PBIP and $F_6$-SPS. No cloudiness was observed. After centrifugation, this blend solution was cast onto flat glass and spread with a Doctor knife with the gap set at 1.4 mm. The blend solution was allowed to dry for 24 hours, forming a blend membrane of PBIP and $F_6$-SPS. This blend membrane contained a 80:20 ratio of PBIP:$F_6$-SPS by weight. The dry blend membrane was wet with 4 M sulfuric acid and allowed to stand for another 24 hours under an aluminum foil cover forming a blend membrane. The blend membrane was then carefully washed with deionized water, taken off the glass, and placed in 0.5 N sulfuric acid. FIG. 5 shows the polarization curves of this PBIP:$F_6$-SPS blend membrane fuel cell operating at 95° C. and 30 psig. The open cell voltage was 0.98V and the fuel cell containing the PBIP-$F_6$-SPS blend membrane had a current density of 2.0 A/cm$^2$ at 0.5V. The conductivity of this membrane was 0.11 S/cm.

EXAMPLE 24

Figure 6:
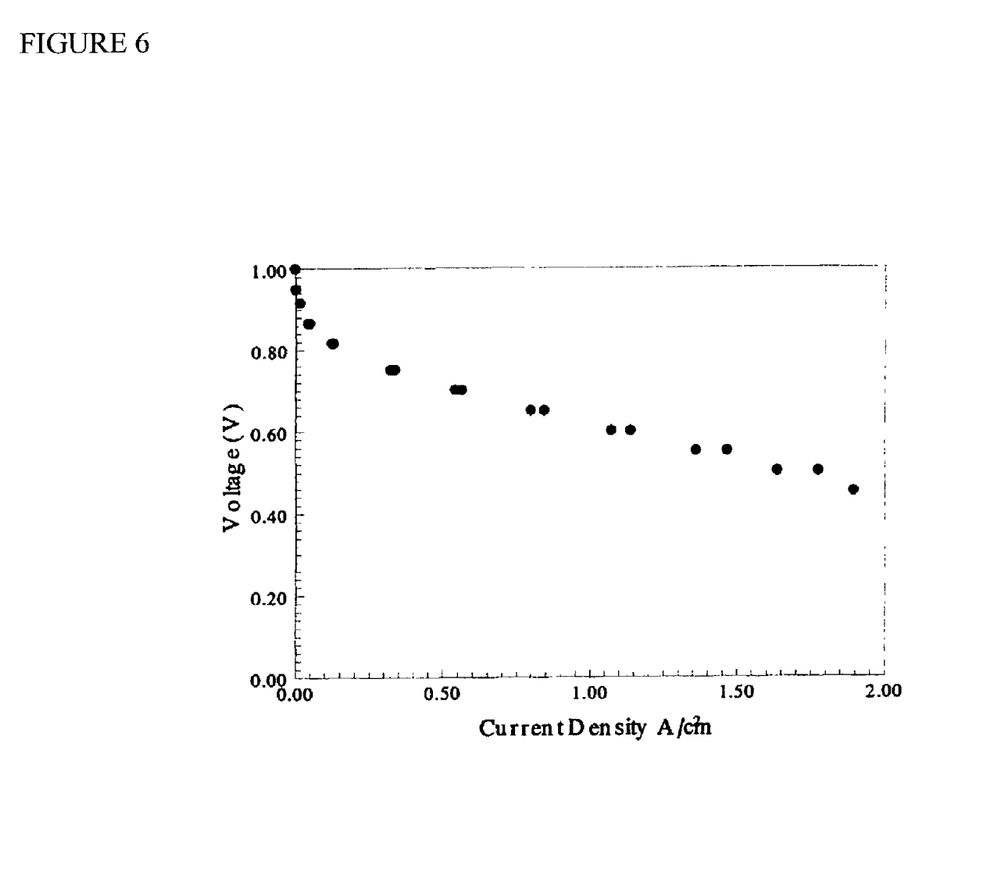
FIG. 6 shows a polarization graph of a fuel cell assembly having a membrane as described in Example 24, and a platinum (Pt)-carbon/polytetrafluoroethylene (PTFE) electrode (Pt loading is 0.17 mg/$cm^2$) operating at 95° C., 30 psig, and cell area of 5 $cm^2$.

The same procedure as in Example 23 was used except that the weight ratio of PBIP to $F_6$-SPS (1.91 meq H+/g) was 70:30. FIG. 6 shows the polarization curves of this PBIP-$F_6$-SPS blend membrane fuel cell operating at 95° C. and 30 psig. The open cell voltage was 1.0V and fuel cell had a current density of 2.0 A/cm at 0.5V. The conductivity of this blend membrane was 0.11 S/cm.

EXAMPLE 25

Figure 7:
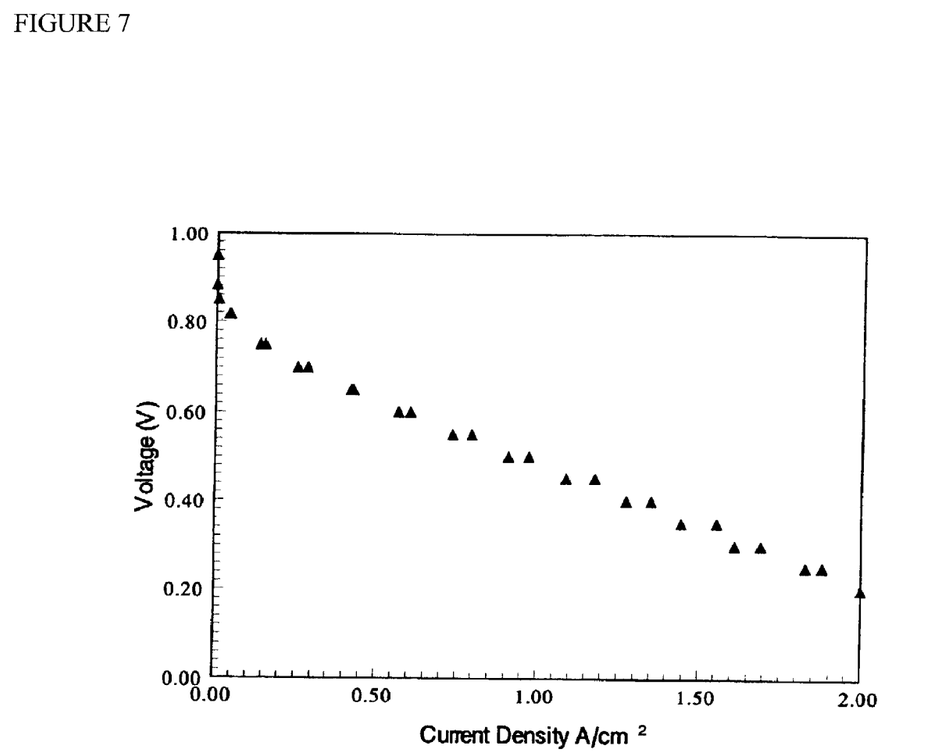
FIG. 7 shows a polarization graph of a fuel cell assembly having a membrane as described in Example 25, and a platinum (Pt)-carbon/polytetrafluoroethylene (PTFE) electrode (Pt loading is 0.17 mg/$cm^2$) operating at 100° C., 30 psig, and cell area of 5 $cm^2$.

A solution of 5% PBIP, product of Example 6, and a 20% solution of sulfonated poly ether sulfone (SPES) (2.55 meq H+/g) in water were separately prepared. Addition of sodium hydroxide to the PBIP/water slurry, pH=8–9, was required for dissolution of the high charge density PBIP. The 5% PBIP solution (9.1 g) was mixed with 0.29 g of the 20% aqueous solution of SPES, forming a blend solution of PBIP and SPES. No cloudiness was observed. After centrifugation, this blend solution was cast onto flat glass and spread with a Doctor knife with the gap set at 1.4 mm. The solution was allowed to dry for 24 hours, forming a blend membrane. This PBIP-SPES blend membrane contained a 90:10 ratio of PBIP:SPES. The dry blend membrane was then wet with 0.5 N sulfuric acid before being taken off the glass and was ion exchanged in a large excess of 0.5 N sulfuric acid. FIG. 7 shows the polarization curves of this PBIP-SPES blend membrane fuel cell operating at 100° C. and 30 psig. As can be seen from FIG. 7, the fuel cell containing this blend membrane had a current density of 2.0 A/cm$^2$ at 0.2V and an open cell voltage of 0.95V.

EXAMPLE 26

A light brown sulfonated PBI, PBI-NPS$_2$, was dissolved in trifluoroacetic acid to form a 15 wt % solution. This solution of PBI-NPS$_2$ was centrifuged resulting in a clear solution containing PBI-NPS$_2$, which was poured onto a clear glass plate surface and cast by a Doctor knife. This solution was then placed in a chamber under dry air flow for at least 48 h to evaporate the trifluoroacetic acid and form a membrane. The final membrane was transparent, light yellow with a 40 μm thickness. Then, the membrane was put into boiling water at 150° C. (60 psig) for one hour.

The membrane was placed in 0.5 N sulfuric acid for 0.5 h forming a sulfonated membrane, then dried with KIM-WIPES®, and placed between and in contact with two Pt (Pt loading was 0.17 mg/cm$^2$) carbon-PTFE fuel cell electrodes without application of pressing or elevated pressure and at room temperature. The conductivity of this sulfonated membrane was 0.083 S/cm. The PEM fuel cell (5cm$^2$) containing this membrane was tested at 90° C.–120° C., at 30 psig with $O_2/H_2$ as the reactant gases. It had an open cell voltage of 1.0 V and at 0.3 V, and the fuel cell had a current density of 1.2A/cm$^2$.

TABLE 1

Properties and Performance of Modified PBI Membrane and Their Fuel Cells at 90° C.

| Samples | Conductivity (ρ (S/cm$^2$)) | Charge Density (meq/g) | Open cell Voltage (V) | Current Density (A/cm$^2$) at 0.3 V |
|---|---|---|---|---|
| PBIPOH (example 1–2) | 0.142 | 1.8–2.07 | 0.9 | 0.5 |
| PBIP-OH (example 3) | 0.0625 | 1.39 | 0.9 | 1.0 |
| PBIP-OH (example 5) | 0.062 | 1.76 | 0.9 | 1.0 |
| PBIP-OH (example 6) | NA | 9.4 | 0.98 | 2.0* (0.2 V) |
| PBI-NPS$_2$ (example 7) | 0.172 | 1.3 | 1.0 | 2.5 |
| PBI-NPS$_2$P (example 8) | 0.068 | 1.28 | 0.9 | 0.9 |

*operated at 110° C.
NA = not applicable

TABLE 2

Properties and Performance of Modified PBI Blend Membrane and Their Fuel Cells at 90° C.

| Samples PBIP:PBINPS | Conductivity (ρ) (S/cm$^2$) | Open Cell Voltage (V) | Current Density (A/cm$^2$) at 0.3 V |
|---|---|---|---|
| 7:3 (example 19) | 0.047 | 0.85 | 0.5 |
| 5:5 (example 17) | 0.1 | 0.92 | 1.0 |
| 3:7 (example 18) | 0.154 | 0.92 | 0.8 |
| 5:5 (example 20) | 0.04 | 1.0 | 1.2 |
| PBIP/SPPO (example 21) | 0.11 | 0.95 | 1.8** (0.2 V) |
| PBIP/F$_6$-SPS) (example 22) | 0.056 | 0.98 | 2.0** (0.4 V) |
| PBIP/F$_6$-SPS) (example 23) | 0.11 | 0.98 | 2.0* (0.5 V) |
| PBIP/F$_6$-SPS) (example 24) | 0.125 | 1.0 | 2.0* (0.5 V) |
| PBIP/SPES (example 25) | 0.11 | 0.95 | 2.0** (0.2 V) |

*operated at 95° C.,
**operated at 100° C.

What is claimed is:

1. A modified polybenzimidazole having a chemical structure characterized by the following recurring unit:

wherein X is selected from the group consisting of: H, $CH_2CH_2CH_2SO_3H$, $PO(OCH_2CH_3)_2$, $PO(OH)_2$, and $PO(OCH_3)_2$; and R is selected from the group consisting of: Br, $PO(OCH_2CH_3)_2$, $PO(OH)_2$, and $PO(OCH_3)_2$; and having a number average molecular weight between 2,000 and 1,000,000 Da.

2. The modified polybenzimidazole of claim 1, wherein at least some of the X and R groups contain $PO(OCH_2CH_3)_2$ and $PO(OCH_3)_2$.

3. The modified polybenzimidazole of claim 2, wherein said X and R groups have a degree of substitution ranging from 0.3 to 3.5.

4. The modified polybenzimidazole of claim 1, wherein said X and R groups are $PO(OCH_2CH_3)_2$ and $PO(OCH_3)_2$ and have a degree of substitution ranging from 0.3 to 1.0, and said modified PBI is soluble in both polar aprotic solvents selected from the group consisting of: N,N-dimethyl formamide; N,N-dimethyl acetamide; dimethyl sulfoxide; and in acids selected from the group consisting of trifluoroacetic acid, concentrated sulfuric acid, and phosphoric acid.

5. The modified polybenzimidazole of claim 1, wherein X and R groups are $PO(OCH_2CH_3)_2$ and $PO(OCH_3)_2$ and have a degree of substitution ranging from 2.0 to 3.5, and said modified PBI is soluble in lower alcohols selected from the group consisting of: methanol, ethanol, isopropanol, and in polar aprotic solvents selected from the group consisting of N,N-dimethyl formamide, N,N-dimethyl acetamide, and dimethyl sulfoxide.

6. The modified polybenzimidazole of claim 1, wherein at least one or more of the X groups is $CH_2CH_2CH_2SO_3H$.

7. The modified polybenzimidazole of claim 2, wherein a further modification is hydrolysis.

8. The modified polybenzimidazole of claim 7, wherein the further modification is carried out by a trimethylsilyl halide selected from the group consisting of: trimethylsilyl bromide, trimethylsilyl chloride, trimethylsilyl iodide, and trimethylsilyl chloride and iodide.

9. The modified PBI of claim 4, wherein bromine-treated trifluoroacetic acid dissolves the modified PBI.

10. The modified polybenzimidazole of claim 5, wherein the hydrolyzed modified polybenzimidazole contains both sulfonic and phosphonic acid groups.

11. The modified polybenzimidazole of claim 8, wherein said iodide of the trimethylsilyl chloride and iodide, is selected from the group consisting of: potassium iodide, sodium iodide, and lithium iodide.

* * * * *

UNITED STATES PATENT AND TRADEMARK OFFICE
CERTIFICATE OF CORRECTION

PATENT NO.        : 6,987,163 B2
APPLICATION NO. : 10/213694
DATED             : January 17, 2006
INVENTOR(S)       : Israel Cabasso, Youxin Yuan and Frederick E. Johnson It is certified that error appears in the above-identified patent and that said Letters Patent is hereby corrected as shown below:

Column 2, lines 39 and 40, after "fuel cells", delete "and in electrochemical applications".

Column 4, lines 56-57, "dialkyl phosphon ate" should read as --dialkyl phosphonate --.

Column 4, line 59, "peaks" should read as --parts--.

Column 4, line 59, "minute" should read as --million--.

Column 4, line 64, delete "3.57" and substitute therefore --3.5--.

Column 4, line 64, before "phosphante groups" insert -- 7 phosphonate groups per 2 repeat units)--.

Column 4, line 65, after "units)", delete "may be" and substitute therefore --shown--.

Column 14, line 42, after "Proton NMR", delete "and elemental".

Signed and Sealed this

Seventh Day of August, 2007

JON W. DUDAS
*Director of the United States Patent and Trademark Office*